United States Patent Office 3,046,412
Patented July 24, 1962

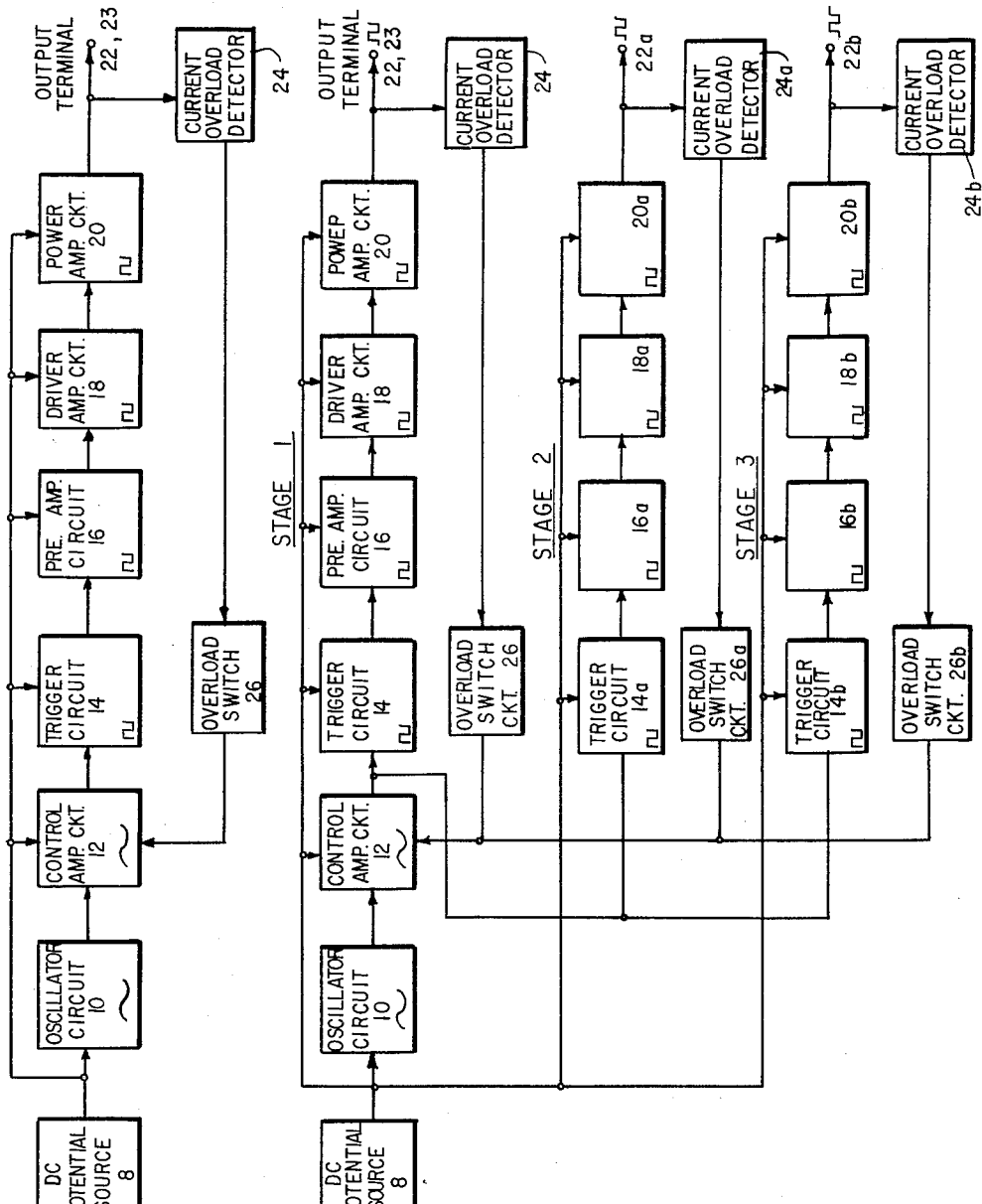

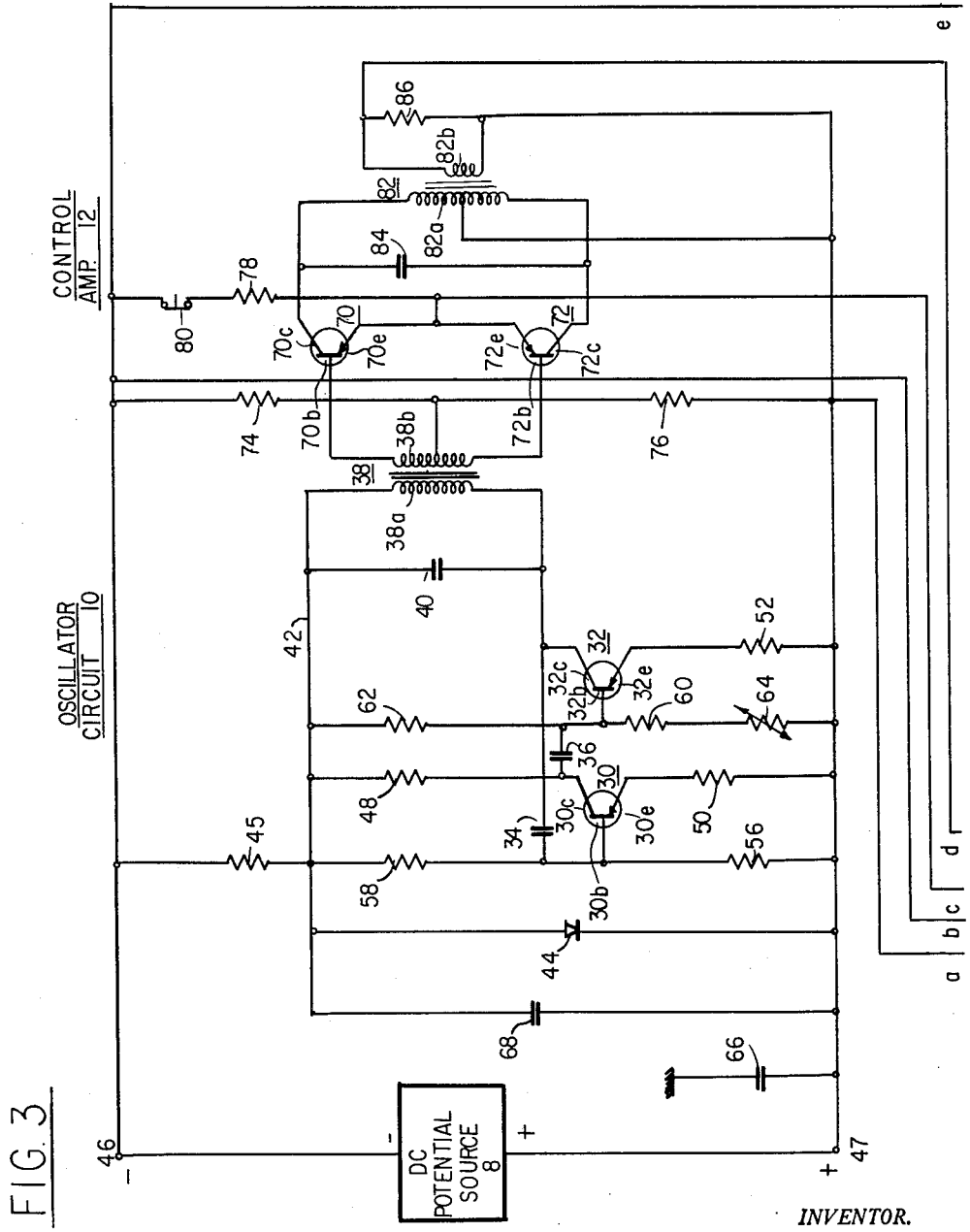

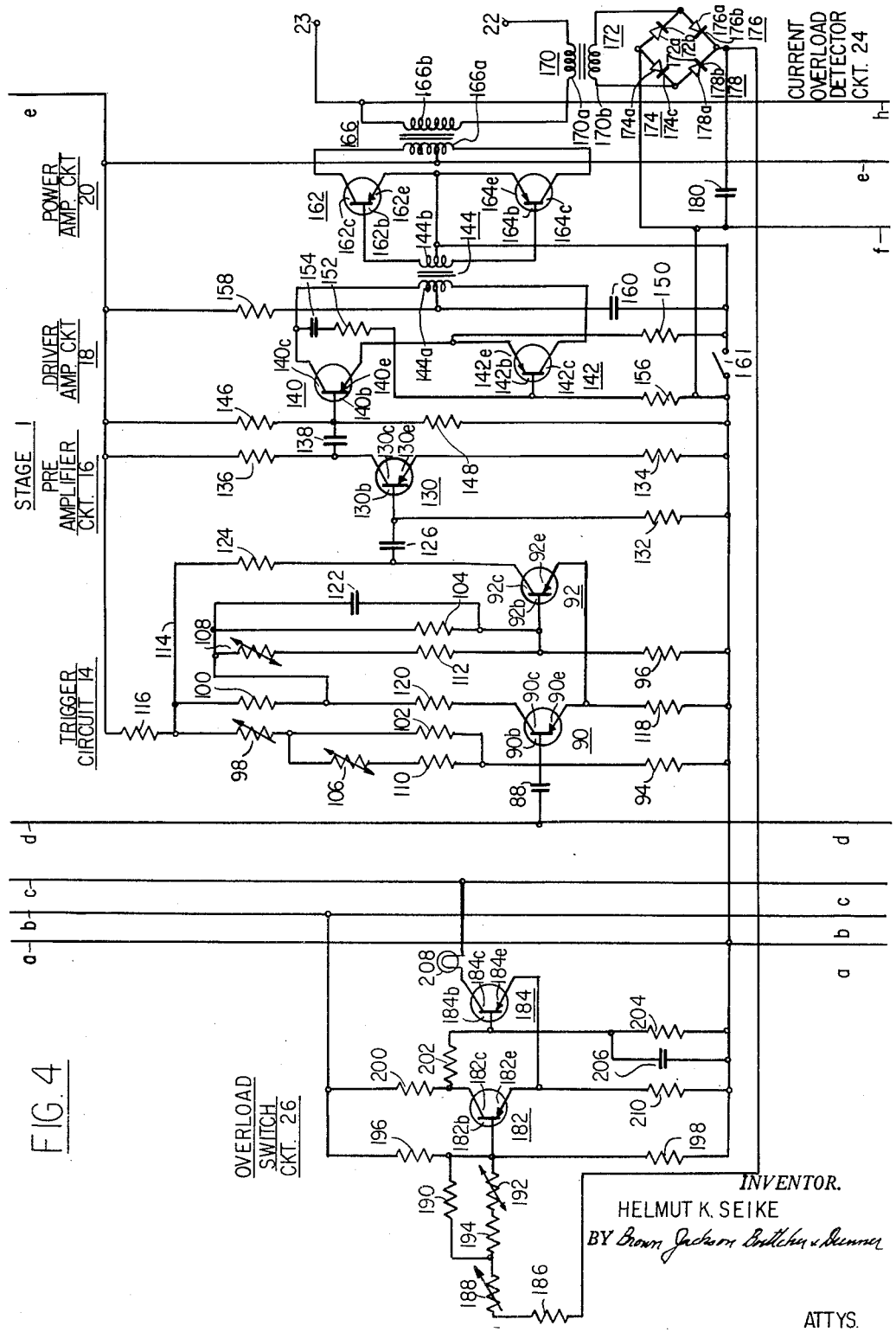

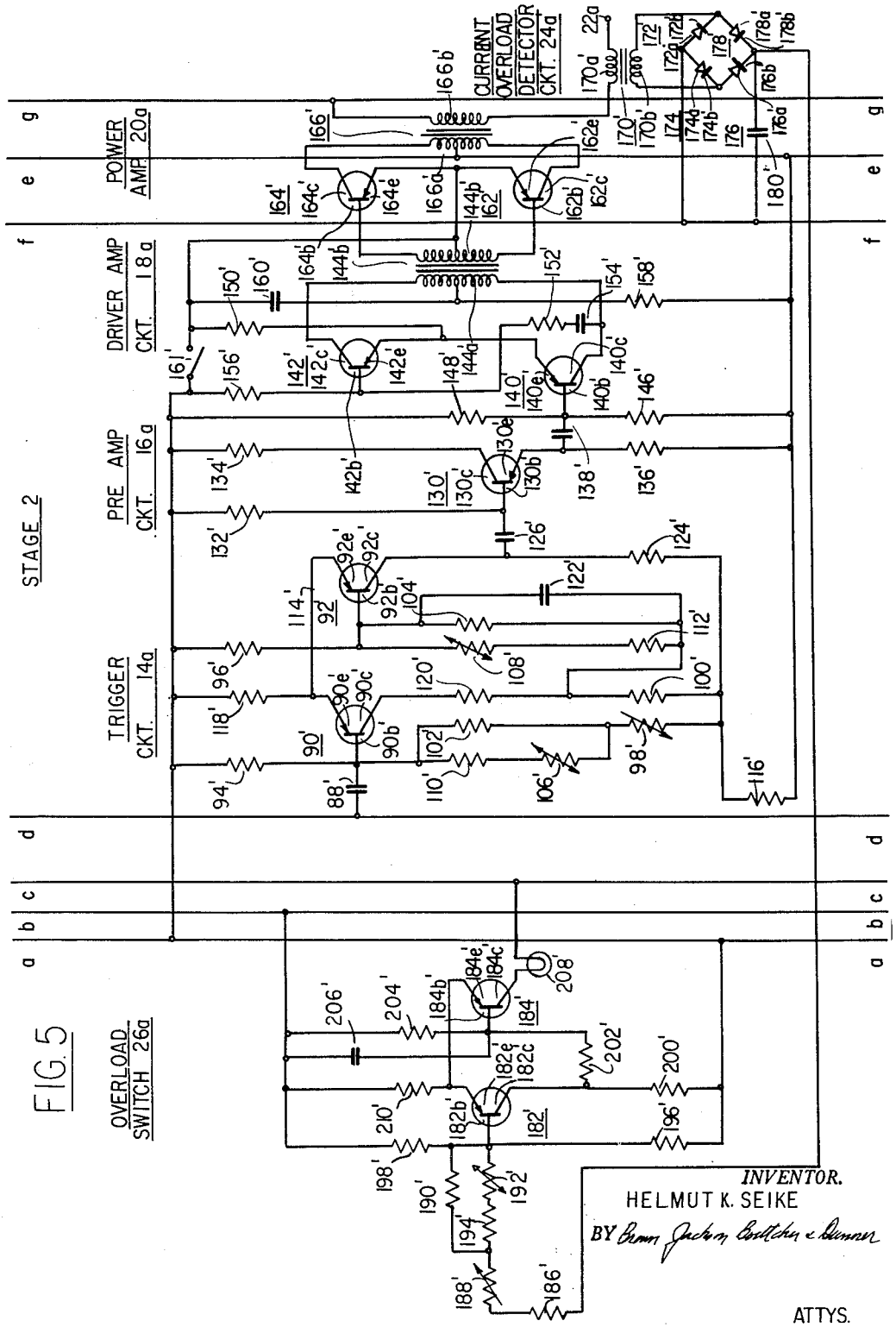

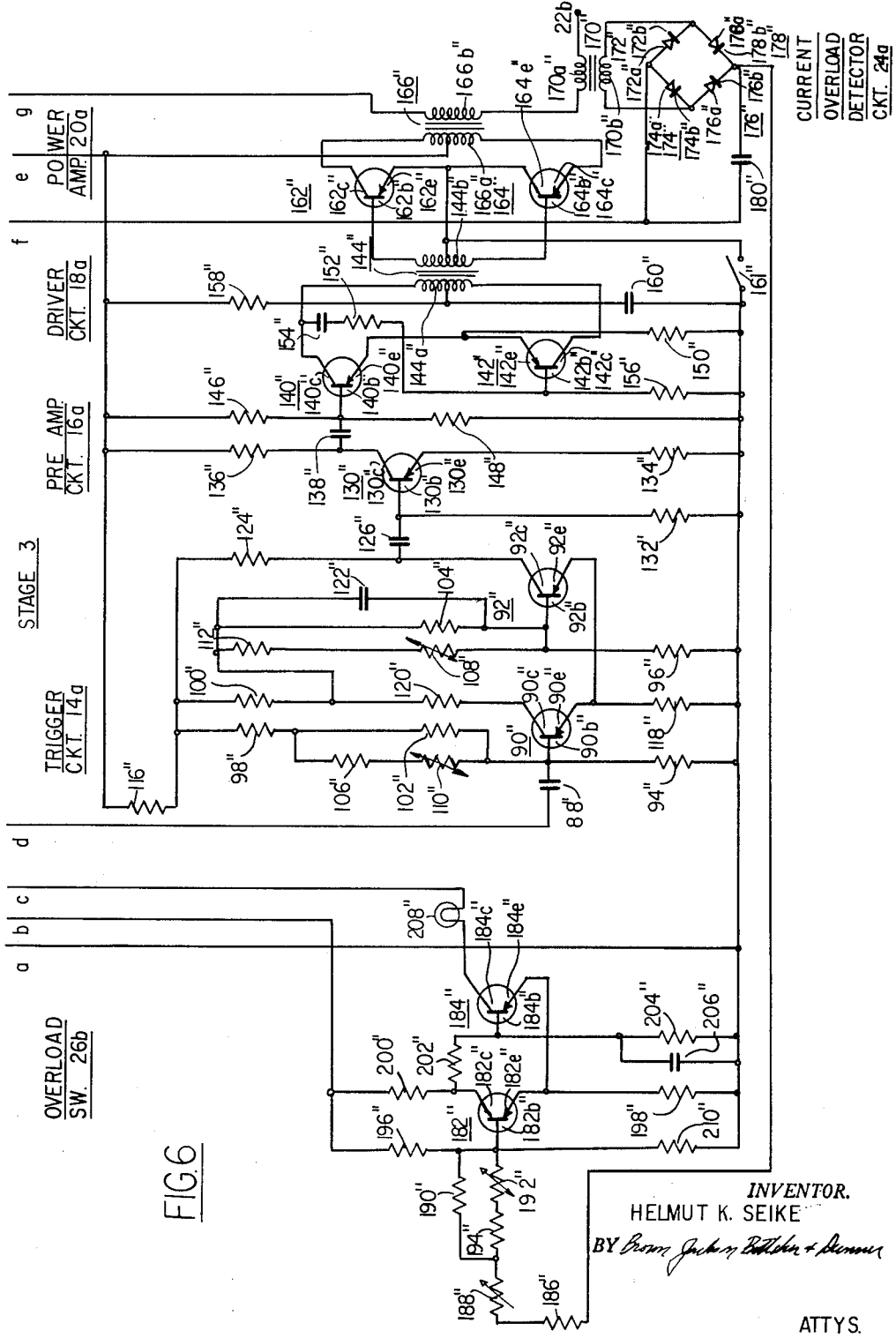

3,046,412
STATIC POWER INVERTER
Helmut K. Seike, Toledo, Ohio, assignor to Kaiser Industries Corporation, Toledo, Ohio, a corporation of Nevada
Filed Feb. 13, 1959, Ser. No. 793,129
14 Claims. (Cl. 307—82)

The present invention relates to a static device for converting electrical energy from direct current energy to alternating current energy, and particularly to a static converter having a substantial power output.

In certain industrial and military fields, there has been a known need for portable electrical equipment which is capable of converting direct current into alternating current energy. Such need is particularly great, for example, in undeveloped areas which are without electrical power of any type, and in such areas, it is not uncommon to use a mobile-mounted power source which is readily moved from one area to another to obtain maximum use of the limited amount of equipment which is available. Thus in the propagation of educational information and the provision of entertainment for the people of such areas, it is not uncommon to utilize a mobile unit whose equipment includes a power source, loudspeaking apparatus, film projectors, and lighting devices. In that the equipment is preferably operated from an alternating current source, the mobile units have also normally included a rotary type inverter which includes a motor-generator set connected to operate from the direct current battery source.

Such rotary supplies have many disadvantages, including a high, unpleasant noise level, a low efficiency, and a high frequency breakdown due to their use of moving parts. Further, such units are bulky and cumbersome, and the space requirements in many installations create serious problems.

The need for an improved inverter device has long been evident, and as a result, vacuum tube A.C. supplies were developed to eliminate the problems associated with the rotary type inverter. However, such units also were discovered to be limited in their usefulness since they usually require a power supply capable of providing three or four hundred volt potentials for operation. A power supply which provides D.C. voltage of such value is of course extremely cumbersome, and of such size and weight as to make inclusion thereof impractical in many mobile unit applications. Furthermore, vacuum tubes are subject to breakage due to shock, vibration, and other severe operating conditions, and because of the high power consumption, the tubes operate at relatively high temperatures which, in turn, creates the need for equipment which will provide cooling of the vacuum tubes. Thus the provision of vacuum tube inverters has not fulfilled the needs of the art in many respects.

The recent development and use of transistors has resulted in the provision of transistor devices having new and improved characteristics, and particularly in the provision of electronic circuits of greater operating stability under severe operating conditions, and of increased longevity and dependable operation. The use of transistor devices also inherently reduces the complexity, size, and weight of the power supply required, since transistors require only a six to thirty volt potential for energization. This in turn permits the provision of static power supplies which are small and light enough for easy transportation, and in which the heat production resulting from power consumption is low enough to permit efficient packaging of the supply as a portable unit.

However, the operating characteristics of transistor devices are variable—dependent upon the operating temperature of the transistor at any given time. Furthermore, the transistors themselves, as now known in the art, are subject to damage and breakdown by overheating, and are normally rated as relatively low current devices. Since a conventional power supply is normally required to supply several amperes of current at 110 volts, the use of known transistors in known amplifier circuits has not heretofore permitted the provision of a static inverter of a size which was practical for normal installations.

It is a general object of the present invention therefore to provide a novel transistorized static device for converting direct current power to alternating current power at a usable and practical level.

It is a still further object of the present invention to provide a static power inverter of this type which is of a compact size and weight and which will provide a more stable operation with variations in the ambient temperature.

It is a further object of the present invention to provide an improved static D.C. to A.C. power inverter which includes an improved automatic protection device for preventing damage to the components of the inverter in the event of the occurrence of overload conditions. A feature of the invention is the manner in which separate stages or power output paths are provided in the device, and individual overload detecting means are provided to detect the occurrence of a fault on any one of the paths, as well as the particular path which supplies the faulty load. Switch means in the inverter permits disconnection of the path having the faulty load, and enablement of the remaining paths, whereby the occurrence of a complete power failure is substantially minimized.

In one preferred embodiment of the present invention, the static device basically comprises a transistor oscillator circuit for providing a low power sine wave, means for amplifying the sine wave, a rapid switch conversion means controlled by the amplified sine wave to produce a square wave having very short rise and fall times, and power amplifier means for amplifying the square wave to the power level required. A load may be coupled to the power amplifier means for operation by the square wave output signal.

The power transistors according to the invention are operated to supply loads of a value which were considered impractical heretofore by driving the transistors to saturation with a square wave signal in an extremely fast time interval. Since the power transistors in the novel invention operate in the region of greater heating only during the rise and fall times of the square wave, and since such time intervals are extremely short in a square wave (substantially vertical leading and trailing edges), the heating time is greatly reduced, and therefore the total heating of the power transistors is also reduced to a level which does not subject the transistors to damage from overheating when extremely high level power signals are coupled thereover.

The automatic protection for the circuit components is provided by the inclusion in the circuit of a detection means which detects any current overload, and overload switching means which are operated by the detecting means to cut off the sine wave supply to the different paths in response to an increase in the current output of the power amplifying means above a predetermined value. Since overheating of a transistor is generally caused by passing too large a current flow through the transistor, cutting off the power transistors of the power amplifying means in response to the detection of the passage of an overload current by those transistors prevents overheating and provides the desired automatic protection.

The stabilization of the operating characteristics with respect to temperature variations is achieved by utilizing thermistors to bias the base electrodes of transistors in the sine wave oscillating circuit, the thermistors being so designed as to maintain the collector current of the transistors constant with ambient changes in the temperature of the transistors. Stabilization of the transistors so that they operate over the same portion of their characteristic curves independent of temperature changes of the transistors thus provides an inverter unit which operates dependably in many different types of surroundings.

In one preferred embodiment of the present invention, the sine wave oscillator circuit means is used to control a plurality of power stages or paths, the different paths supplying associated power output terminals with output alternating current signals. In such arrangement separate ones of the plurality of the power stages may be disconnected as a fault occurs, and the remaining ones of the power stages operated to provide power during the fault locating process. These and other features of the present invention will become apparent with reference to the following specification, claims, and drawings in which:

FIGURE 1 is a block diagram setting forth a first preferred embodiment of the present invention;

FIGURE 2 is a block diagram of a second preferred embodiment of the present invention; and FIGURES 3, 4, 5 and 6 are schematic diagrams of the second preferred embodiment of the invention.

CIRCUIT DESCRIPTION

With reference to FIGURE 1, the static converter of the present invention basically comprises a D.C. power source 8, an oscillator circuit 10 energized by D.C. power source 8 to provide a sine wave output, a control amplifier circuit 12 driven by the oscillator 10, a trigger circuit 14 operated by the sine wave output of the control amplified circuit 12 to produce a square wave output, and a pre-amplifier circuit 16, a driver amplifier circuit 18, and a power amplifier circuit 20 connected in a chain to the output side of the trigger circuit 14 to amplify the square wave signal to the desired level for coupling over output terminals 22, 23 to any desired load. Each of the individual circuits 10, 12, 14, 16, 18, and 20 of the static inverter are comprised solely of static elements such as transistor units for the purpose of obtaining the desired object of the invention.

The output square wave from the power amplifier 20 is also coupled to a current overload detector circuit 24 which senses whether the R.M.S. value of the current output of the power amplifier 20 is greater than the rated value for its transistors. When such a value is detected, the overload detector 24 produces an output signal to energize an electronic overload switch circuit 26 which is coupled to the control amplifier 12. In its de-energized condition, the overload switch 26 does not affect the operation of the control amplifier 12. However, with the detection of an overload current, the overload switch 26 is operative to bias the transistors in the control amplifier 12 to the quiescent state to prevent the passage of the signals from the oscillator circuit 10 to the trigger circuit 14, whereby the circuits 14, 16, 18 and 20 are rendered inoperative and damage to the components of the circuits 14, 16, 18 and 20 is prevented. A reset switch 80 (FIGURE 3) is provided for the purpose of enabling the inverter subsequent to automatic cutoff.

Referring to FIGURE 2, a second embodiment of the present invention for providing an inverter device of a substantially increased power output is thereshown. The second embodiment basically comprises an oscillator circuit 10 and a control amplifier circuit 12 operating in the manner of the first embodiment to supply each of a plurality of stages 1, 2, 3, each of the stages 1, 2, 3 comprising a trigger circuit such as 14, 14a, 14b, which is operative to produce a square wave signal output in response to the signal output of the control amplifier 12. Each trigger circuit 14, 14a, 14b is, in turn, coupled over an associated preamplifier such as 16, 16a, 16b, an associated driver amplifier such as 18, 18a, 18b, and an associated power amplifier such as 20, 20a, 20b to produce an amplified square wave signal for coupling to an associated output terminal, such as 22, 22a, 22b, 23.

Each power amplifier 20, 20a, 20b is coupled to an associated overload detector circuit, such as 24, 24a, 24b and an overload switch circuit 26, 26a, 26b which operate as heretofore described to interrupt the signal supply to the stages 1, 2, 3 responsive to the occurrence of an overload condition in any one of the stages 1, 2, 3. That is, the output signals of the overload switches 26, 26a, 26b are coupled in parallel to the control amplifier 12 so that the energization of any one of this plurality of switches 26, 26a, 26b biases the transistors of the control amplifier 12 to the quiescent state to terminate operation of each of the stages 1, 2, 3.

The static inverter set forth in FIGURE 2 provides a plurality of output power sources which are isolated from one another, and which may be of different voltage levels, power ratings or phases. Also, by varying the design of the trigger circuits 14, 14a, 14b to produce waveforms of different durations, if desired (while yet maintaining a vertical rise time and decay), power pulses may be provided to adapt the unit for further types of applications. Filter or other means may also be coupled to any of the output terminals 22, 22a, 22b to provide a change of the output waveform for additional types of applications. Furthermore, variation in the frequency of the alternating current signal output of the control amplifier 12 may be effected by conventional frequency adjustment devices to provide further flexibility of the novel static inverter.

SPECIFIC CIRCUIT DESCRIPTION

Referring to FIGURES 3–6, the circuit of one specific design of the static inverter of FIGURE 2 is shown in detail. As thereshown the static inverter includes a D.C. potential source 8, oscillator 10, control amplifier 12 for controlling stage 1 (FIGURE 4), stage 2 (FIGURE 5), and stage 3 (FIGURE 6), which are comprised respectively of the trigger circuits 14, 14a, 14b, preamplifier circuits 16, 16a, 16b, driver amplifier circuits 18, 18a, 18b, and power amplifier circuits 20, 20a, 20b.

The oscillator circuit 10 (FIGURE 3) comprises a first and a second PNP transistor 30, 32, each comprising a base electrode 30b, 32b, a collector electrode 30c, 32c and an emitter electrode 30e, 32e, connected in a circuit comparable to a tuned collector oscillator of the Franklin type to produce a sine wave output signal. Collector 30c of transistor 30 is connected over capacitor 36 to the base 32b of transistor 32, and collector 32c of transistor 32 is connected over capacitor 34 to the base 30b of transistor 30. A coupling transformer 38, comprising a primary winding 38a and a secondary winding 38b, is connected in the output circuit of the transistor 32 to couple the sine wave output signals of the oscillator circuit 10 to the control amplifier 12.

More specifically, the collector 32c of the second transistor 32 is loaded by a parallel tuned circuit, comprising the primary winding 38a and a parallel connected capacitor 40, and is connected to the tuned circuit, conductor 42, and a voltage divider comprised of a Zener diode 44 and a resistor 45 which are coupled to the negative and positive terminals 46 and 47 of the D.C. power source 8. The voltage divider comprising Zener diode 44 and resistor 45 bias conductor 42 to a fixed negative potential. The collector 30c of the first transistor 30 is connected over resistor 48 to the conductor 42 and is negatively biassed thereby.

The emitters 30e, 32e of each transistor 30, 32 are each connected through a current feedback resistor, such as 50, 52 respectively, to the positive terminal 47.

The base 30b of the transistor 30 is biassed negative by two resistors 56, 58 which are coupled between the negatively biassed conductor 42 and the positive terminal 47 of the power source 8, and base 32b of transistor 32 is biassed negative by resistors 62 and 60 and thermistor 64 which are connected in series between the negatively biassed conductor 42 and the positive terminal 47. As will be explained in more detail later, the purpose of the thermistor 64 is to stabilize the frequency of oscillation of the oscillator 10 in the event of ambient temperature changes and the consequent variation of the operating characteristics of the transistors 30, 32 of the oscillator circuit 10.

A capacitor 66 is connected from positive voltage terminal 47 to ground to by-pass any A.C. ripple which appears between the positive terminal 47 and ground, and capacitor 68 is connected across the Zener diode 44 to protect the diode from injury by A.C. peaks.

It is apparent that any oscillation in the tuned circuit of the oscillator circuit 10 will be coupled through capacitor 34 to the base 30b of transistor 30 for amplification. The amplifier output signal which appears at the collector 30c is coupled over capacitor 36 to the base 32b of transistor 32. The signal as amplified by transistor 32 is coupled in amplified form across the tuned circuit which is connected in the collector circuit of transistor 32. The amplified voltage signal output of transistor 32 is coupled to the tuned circuit to effect an increased current flow over primary winding 38a, which increased signal is coupled back over the base emitter circuit of transistor 30 to effect increased conductivity thereof. The increased signal output of transistor 30 is coupled to transistor 32 to increase the conductivity thereof and thereby effect increased signal current flow in the tuned circuit. In this manner the output signal of the oscillator 10 is progressively increased until such time as the transistor 32 is driven to the saturation state, at which time current flow becomes constant and no further voltage is induced across the primary winding 38a. Capacitor 40 discharges through the primary winding 38a providing a signal thereacross which is coupled to transistors 30, 32 to decrease the conductivity and the emitter current thereof. The decrease of the emitter current of transistor 32 causes the magnetic field of the primary winding 38a to collapse, and induces therein a voltage of a reversed polarity. Capacitor 40 is therefore charged to a high negative voltage, and the base emitter circuits are driven to cutoff. At this time capacitor 40 discharges and the base emitter circuits of transistors 30, 32 are biassed to a point of conductivity whereby the emitter current begins to flow and the cycle is reinitiated. The frequency of these oscillations may be determined by standard methods known to those skilled in the art and may be fixed at any desired value by designing the parameters of the tuned circuit 38a, 40.

The thermistor 64 is included in the circuit to provide an oscillation frequency which remains stable with changes in the temperature of the circuit components. The thermistor element 64 is a well known device and basically consists of a resistive element having a resistance which is dependent upon the ambient temperature. In the present arrangement, the thermistor 64 is placed in close proximity with transistor 32 so that the heat which affects the operating characteristics of transistor 32 also affects the thermistor 64. That is, in a normally biassed transistor, a change in the ambient temperature causes a change in the operating characteristics of the transistor unit, which effects a corresponding change in the collector current output of the transistor. If the transistor is used in an oscillator, this change in collector current in turn changes the amplitude of oscillation, whereby a temperature-dependent change occurs in the frequency of oscillation. However, the biasing arrangement of the base 32b, including the thermistor 64, is designed to compensate for the change in the operating characteristics due to heating by varying the bias on the base 32b to stabilize the collector current output and the frequency of oscillation of the oscillator circuit 10.

Thus the oscillator circuit 10 produces a low power, constant frequency, low distortion sine wave which is substantially independent of variations in the temperature of the transistors 30, 32. In that the Zener diode 44 is connected between conductor 42 and positive terminal 47, the supply potential for the transistors is maintained constant over a wide range of current values, and the operation of the transistors 30, 32 is substantially independent of fluctuations in voltage provided by power source 8. The sine wave output of the oscillator circuit 10 which appears across the primary winding 38a of the coupling transformer 38 is coupled over the secondary winding 38b of the transformer to the control amplifier stage 12.

The control amplifier circuit 12 is connected between the oscillator circuit 10 and the trigger circuits 14, 14a, 14b of the different stages 1, 2, 3 for the purpose of amplifying the sine wave output signal of the oscillator 10 prior to coupling thereof to the trigger circuits 14, 14a, 14b. Further, the control amplifier circuit 12 provides isolation between the trigger circuits 14, 14a, 14b and oscillator 10 to protect the oscillator 10 from the heavy loading of the trigger circuits 14, 14a, 14b. Additionally, as will be shown hereinafter, the control amplifier circuit 12 provides a convenient structure for interrupting the operation of the stages 1, 2, 3 in response to detection of an overload current.

The control amplifier circuit 12 comprises a pair of NPN transistors 70, 72 each having base electrodes 70b, 72b, collector electrodes 70c, 72c, and emitter electrodes 70e, 72e, respectively, connected in a push-pull amplifier arrangement, to provide an amplified sine wave output. The output signals of the amplifier units 70, 72 are coupled over a second coupling transformer 82 having a primary 82a and a secondary 82b to the trigger circuits 14, 14a, 14b of the different stages 1, 2, 3.

More specifically, the output signal of the oscillator circuit 10 is coupled to the primary winding 38a of the coupling transformer 38. The secondary winding 38b of transformer 38 is coupled to base electrodes 70b, 72b, respectively of transistors 70, 72, a center tap thereon being connected to the bias determining voltage divider 74, 76 which is, in turn, coupled between positive and negative terminals 47, 46 of source 8. Emitters 70e, 72e of transistors 70, 72 are connected together, and the common point is connected over current feedback resistor 78 and reset switch 80 to the negative terminal 46 to provide the D.C. emitter currents with a common degenerative path. The common point for emitters 70e, 72e, is also connected to each of the overload switches 26, 26a, 26b to provide means for biassing transistors 70, 72 to cut-off when an overload condition occurs. Collectors 70c, 72c are connected over a primary winding 82a of the second coupling transformer 82 to the positive terminal 47.

The two bias resistors 74, 76 act as a voltage divider to set the D.C. bias level for the bases 70b, 72b and may be of adjustable nature to permit operation of the push-pull circuit as class A, AB, B, or C, as desired.

Transistors 70, 72 are both of the NPN type so that a large positive voltage applied at the emitters 70e, 72e will bias them into the cut-off region of operation.

It is apparent that the input sine wave which is produced by oscillator circuit 10 is coupled over the center-tapped coupling transformer 38 to provide out-of-phase signals for the base emitter circuits of the transistor pair 70, 72 to operate the same in a push-pull manner. Push-pull operation is used in the present embodiment to provide a greater output power, and a higher efficiency than would be normally experienced with a single transistor amplifier. The transistor amplifier is further operative to isolate the oscillator circuit 10 from the trigger circuits 14, 14a 14b to protect the oscillator circuit 10 from frequency fluctuations and waveform distortion due to variations in loading. An addition purpose, which is shown in more detail hereinafter, is to effect interruption of the driver signals for the trigger circuits 14, 14a, 14b in response to detection of an overload current in one of the stages 1, 2 and 3.

The output signals of the transistors 70, 72 appear at collectors 70c, 72c and are connected over primary winding 82a of the second coupling transformer 82. The output signals appearing across the secondary winding 82b of the second coupling transformer 82 are capacitor-coupled to each of the three trigger circuits 14, 14a, 14b, over conductor d and capacitor members 88, 88', 88" (FIGURES 4, 5, 6) respectively, the secondary winding 82b of the second coupling transformer 82 being preloaded by resistor 86 to provide voltage stability with load variations, and to prevent interaction between the trigger circuits 14, 14a, 14b of the three stages 1, 2, and 3 (FIGURES 4, 5, and 6 respectively).

Stages 1, 2 and 3 each comprise a trigger circuit such as 14, 14a, 14b, a preamplifier circuit such as 16, 16a, 16b, a driver amplifier circuit such as 18, 18a, 18b, a power amplifier circuit such as 20, 20a, 20b, an overload detector circuit such as 24, 24a, 24b, and an overload switch circuit, such as 26, 26a, 26b, the overload circuits each being coupled over conductor c to control amplifier circuit 12 (FIGURE 3), for control thereby in the provision of output power signals over the associated ones of the output terminals 22, 22a, 22b, and 23. Power supply conductors a, b, and e couple the source 8 to the components of the different circuits.

Each trigger circuit, such as 14, is connected between control amplifier circuit 12 and its associated preamplifier circuit, such as 16, and provides a square wave signal of a vertical rise and fall shape for coupling over the preamplifier circuit in response to the application of each sine wave input signal by control amplifier 12. As noted heretofore, the provision of an output signal which is of a rapid rise time and decay is basic to the provision of increased power amplification for the output signals by the inverting unit.

Since the design and operation of the circuits of each of the trigger circuits 14, 14a, 14b, preamplifiers 16, 16a, 16b, driver amplifiers 18, 18a, 18b, power amplifiers 20, 20a, 20b, overload detectors 24, 24a, 24b, and overload switches 26, 26a, 26b, is similar, only the operation of one set of circuits will be described in detail.

Trigger circuit 14 comprises a first and a second transistor 90, 92, each having a base electrode 90b, 92b, a collector electrode 90c, 92c, and an emitter electrode 90e, 92e, respectively, connected in an emitter-coupled bistable univibrator circuit. The output signal of control amplifier stage 12 is coupled over capacitor 88 to the base 90b of the first transistor 90. The base 90b of the transistor 90 is biassed by a first voltage divider which is connected between negative terminal 46 and positive terminal 47 and comprises resistors 116, 98, 102 and 94, connected in series and a thermistor 106 and resistor 110 which are connected across resistance 102. The base 92b of transistor 92 is biassed by a second voltage divider which is connected between the negative and positive terminals 46 and 47 and which comprises resistors 116, 100, 104 and 96 connected in series and a resistor 112 and a thermistor 108 connected across resistor 104. Capacitor 122 is also connected across resistor 104. The emitters 90e, 92e of the two transistors 90, 92 are connected together, and the common point coupled over resistor 118 to the positive terminal 47 of source 8.

The collector 90c of the first transistor 90 is loaded by resistors 116, 100, 120, which are connected in series between the collector 90c and the negative terminal 46. Collector 90c is also connected over resistors 120 and 104 to the base circuit of the second transistor 92, thermistor 108 and resistor 112 being connected across resistor 104. Collector 92c of the transistor 92 is connected over resistors 116 and 124 to negative terminal 46 of source 8, and over coupling capacitor 126 to the preamplifier stage 16.

It is apparent that the trigger circuit 14 will remain stable in either of two conditions: with the first transistor 90 conductive (cut "on") and the second transistor 92 nonconductive (cut "off"), or with the first transistor 90 cut "off" and the second transistor 92 cut "on." Whenever the transistors 90, 92 are both "on" or both "off," the circuit is in an unstable condition and will tend to change to a stable state.

Trigger circuit 14 is also operative responsive to the application of an input signal to the base 90b of transistor 90 by the control amplifier 12. That is, with the trigger circuit in the condition in which the first transistor 90 is conductive and the second transistor 92 is nonconductive, as a positive input signal is applied to base 90b sufficient to cause non-conduction of the first transistor 90, a more negative potential appears at collector 90c, which is coupled over resistors 120, 104, to the base 92b of the second transistor 92, tending to make it conductive. The signal at the base 92b is transferred to the first transistor 90 over the two emitters 90e, 92e, which are coupled together, and reappears at the collector 90c of the first transistor 90 with the same polarity as at the base 92b of the second transistor 92. This signal at the collector 90c is transferred again to the base 92b, causing a regenerative action to drive the second transistor 92 to saturation and the first transistor 90 to cut-off in an expeditious and rapid manner.

The trigger circuit 16 is held in this state until the input signal is decreased to a level sufficient to cause conduction by the first transistor 90. At that time, in a manner similar to that heretofore described, the first transistor 90 is cut "on" and the second transistor is cut "off."

Thus, the trigger circuit 14 is operative in response to the control signals coupled thereto by the control amplifier 12 to provide a signal at the collector 92c of the transistor 92 which is alternatively of a no-output level or a saturation-output level. The circuits are normally adjusted to effect production of a square wave output, resistor 98 in the biasing arrangement for the base 90b of the first transistor 90 being of a variable type to produce the proper balance of the circuit and the elimination of distortion in the square wave output.

Changes in the operating characteristics of the two transistors 90, 92 due to ambient temperature changes can also introduce distortion in the output square wave. Thermistors 106, 108 are therefore included in the trigger circuit 14 to compensate for such temperature changes, and to hold the collector currents of the two transistors 90, 92 at a constant level. The method of compensation of thermistors 106, 108 is similar to that set forth for thermistor 64 in the oscillator circuit 10.

A small resistor 116 is used to provide a more stable negative potential over conductor 114 to the transistors 90, 92 so that voltage changes which result with operation of the driver amplifier circuit 18 and power amplifier circuit 20 (due to the high transistor collector currents which are drawn by the circuits 18, 20 under full load) will not influence the operation of the trigger circuit 14.

As noted heretofore, trigger circuit 14 must switch from one condition to the other with great rapidity to reduce the heating of the power stage 20. In accomplishing such end by-pass capacitor 122 is connected in the coupling arrangement between the collector 90c of the first transistor 90 and the base 92b of the second transistor 92 to speed the transfer of signals from the collector 90c to the base 92b. Snap action of the trigger circuit 14 and very short rise and fall times in the square output wave form are thus provided.

It should also be noticed that the use of an emitter coupled circuit in the trigger circuit 14 permits capacitor coupling (126) of the output signals of the trigger circuit 14 to the preamplifier stage 16 without retarding the regenerative action of the trigger circuit 14. Preamplifier circuit 16 is connected between trigger circuit 14 and driver amplifier circuit 18 to amplify the square wave output of trigger circuit 14 and couple such signal to driver amplifier 18. The primary purpose of the preamplifier circuit 16 is to provide isolation for trigger circuit 14 from driver amplifier 18, in that heavy loading on the trigger circuit 14, would slow down the switching action of the trigger circuit 14.

The preamplifier circuit 16 comprises a transistor 130 having a base electrode 130b, an emitter electrode 130e, and a collector electrode 130c connected in a common-emitter amplifier circuit. Base electrode 130b is coupled over capacitor 126 to the trigger circuit 14 to receive the square wave output of trigger circuit 14 and over resistor 132 to positive terminal 47 of source 8. Emitter electrode 130e is also connected through a resistor 134 to the positive potential terminal 47. Collector electrode 130c is connected over a resistor 136 to the negative potential terminal 46, and over a coupling capacitor 138 to driver amplifier stage 18 to provide an output square wave thereto. The coupling capacitors 126, 138 should be of large value to prevent distortion of the square wave signal.

The transistor 130 of the preamplifier circuit 16 is biassed normally "off" by resistor 132. When the second transistor 92 of the trigger circuit 14 cuts "off," a negative signal is coupled through coupling capacitor 126 to the base 130b of the preamplifier transistor 130, which signal is of sufficient value to bias same to conduct sharply. Thus the coupling of a square wave input to the preamplifier transistor 130 by the second transistor 92 of the trigger circuit 14 causes the preamplifier transistor 130 to switch from its "off" state to its saturation state to produce an amplified square wave output which is coupled through a coupling capacitor 138 to the driver amplifier stage 18.

Driver amplifier circuit 18 is connected between preamplifier circuit 16 and power amplifier circuit 20 to provide a square wave signal of sufficient amplitude and power to the power amplifier 20 to drive the transistors of the power amplifier circuit 20 to saturation in response to the application of a square wave signal from the preamplifier 16 to the driver amplifier.

The driver amplifier circuit 18 comprises two transistors 140, 142 each having a base electrode 140b, 142b, a collector electrode 140c, 142c, and an emitter electrode 140e, 142e, respectively, coupled for alternative conduction to provide an output square wave over a coupling transformer 144 to the power amplifier 20.

The base 140b of the first transistor 140 is coupled to the preamplifier circuit 16 through coupling capacitor 138, and to a fixed biasing arrangement comprising two resistors 146, 148 which are connected between the negative potential terminal 46 and the positive potential terminal 47.

The emitters 140e, 142e of the two transistors 140, 142 are connected together, and the common point coupled over resistor 150 to the positive potential terminal 47. Collectors 140c, 142c of transistors 140, 142 are coupled to the center-tapped primary 144a, and the collector 140c of the transistor 140 is also coupled through a resistor 152 and capacitor 154 to the base 142b of the second transistor 142. The base 142b of the second transistor 142 is provided with a floating bias by its coupling through a resistor 156 to the positive potential terminal 47. A center tap on the primary 144a is coupled through a resistor 158 to the negative potential terminal 46 and through a capacitor 160 to the positive potential terminal 47. Collectors 140c, 142c are connected over the primary winding 144a and resistor 158 to the negative potential terminal 46.

A main switch 161 is connected between the positive potential terminal 47 and the driver amplifier circuit 18 to interrupt the power to the driver amplifier circuit 18 and the power amplifier circuit 20 as desired. That is, the oscillator circuit 10, control amplifier circuit 12, trigger circuit 14 and preamplifier circuit 16 are maintained constantly energized during periods of use to minimize the temperature differentials during periods when a portion of the load is not being drawn.

With switch 161 closed, and no input signals from preamplifier circuit 16, transistor 140 of driver amplifier circuit 18 is biassed normally "on" to saturation by resistors 146, 148, and positive signal output of the collector 140c is coupled to the base 142b of the second transistor 142 to bias it normally "off," and an output signal will appear across the top half of coupling transformer 144.

Driver amplifier 18 will also be in this condition when a low voltage output signal is received from preamplifier 16 indicating that preamplifier transistor 130 is in the saturation state, and the output signal appears, as before, across the top half of coupling transformer 144. When a high voltage output signal, indicating that preamplifier transistor 130 is in the cutoff state, is coupled through capacitor 138 from the preamplifier circuit 16, the first transistor 140 is driven nonconductive, and in turn produces a negative output signal at the collector 140c of the first transistor 140 to drive the second transistor "on" to saturation and to provide an output signal across the bottom half of coupling transformer 144. Thus the square wave input to the base 140b from the preamplifier 16 alternately switches the transistors 140, 142 from the "off" state to the saturation state to produce an amplified square wave across the coupling transformer 144 for the power amplifier stage 20.

The driver amplifier 18 is maintained in a non-oscillatory condition, with the first transistor 140 non-conductive and the second transistor 142 conductive, whenever the input square wave signal from preamplifier circuit 16 is cut off due to the control amplifier circuit 12 being disenabled by the detection of an overload current.

Power amplifier circuit 20 is connected between driver amplifier circuit 18 and output terminals 22, 23 to provide a high power square wave output signal which may be coupled over output terminals 22, 23 to a load (not shown) in response to the application thereto of a square wave driving signal from driver amplifier 18.

The power amplifier circuit 20 comprises two transistors 162, 164, each having a base electrode 162b, 164b, a collector electrode 162c, 164c, and an emitter electrode 162e, 164e, respectively, connected in a push-pull amplifier arrangement and driven by the square wave output of the driver amplifier 18 to couple an amplified square wave output over the output transformer 166, having a primary winding 166a and a secondary winding 166b, to the output terminals 22, 23.

The output signal of the driver amplifier is coupled over the primary and the secondary windings 144a and 144b of the coupling transformer 144, respectively. A center-tap on the secondary winding 144b of transformer 144 is connected to the positive potential terminal 47 to provide the D.C. bias necessary to effect class C operation of the power amplifier 20 and the out-of-phase A.C. input signals for effecting push-pull operation of the transistors 162, 164 of the amplifier.

Emitters 162e, 164e of transistors 162, 164 are directly connected to the positive potential terminal 47, and collectors 162c, 164c of transistors 162, 164 are connected to opposite ends of the center-tapped primary winding 166a of an output transformer 166. The center-tap of the primary winding 166a is coupled to the negative potential terminal 46 to provide a D.C. bias to the collectors 162c, 164c of transistors 162, 164. The secondary winding 166b of output transformer 166 is coupled to the output terminals 22, 23.

The input square wave alternately drives each transistor 162, 164 to saturation. When transistor 140 of driver amplifier circuit 18 is in the saturation state and transistor 142 of the driver amplifier circuit 18 is in the cutoff state to provide an output signal across the top half of coupling transformer 144, power transistor 162 is driven to cutoff to produce a large negative output power signal from output terminal 23 to terminal 22. When transistor 140 is cut off and transistor 142 is in the saturation state to provide an output signal across the bottom half of transformer 144, power transistor 164 is driven to cutoff and a large positive output power signal appears from output terminal 23 to terminal 22. The entire voltage swing possible between the positive and negative potential sources 46, 47 is employed and the transistors 162, 164 are operated in the condition of lesser heating through power consumption and a greater power output of the converter is permitted.

As noted heretofore, the use of a square wave signal permits the energization of the transistor devices by power pulses of a value not previously considered possible without damaging the transistor units. The output transformer 166 may be used to step up the output square wave voltage still further, if desired. A load (not shown) may be connected to the output terminals 22, 23 in the conventional manner for operation by the square wave output of the secondary winding 166b. It has been found that most known electrical devices including motors, heaters, power sources, radios, etc., work satisfactorily with such type power output, and that no apparent operating disadvantage is experienced with a square wave output. A novel current overload protection device 24 is incorporated in the arrangement for the purpose of minimizing the possibility of damage to the transistor components of the circuits in the amplification of the high power pulses which are coupled thereto. To such end, the secondary winding 166b of the output transformer 166 is also coupled to the primary winding 170a of a current transformer 170, the secondary winding of which constitutes the input circuit for the current overload detector 24. The detector 24 further comprises a set of four diodes 172, 174, 176, 178 each having an anode 172a, 174a, 176a, 178a and a cathode 172b, 174b, 176b, 178b, respectively, and a capacitor 180 connected in a bridge rectifying circuit, connected across the secondary winding 170b of the current transformer 170. The anodes 172a, 174a of the first two diodes 172, 174 are connected to the positive potential terminal 47 and cathodes 172b, 174b are each connected to the anode 176a, 178a of one of the second two diodes 176, 178, the common points being connected to the secondary winding 170b of current transformer 170. The cathodes 176b, 178b of the second two diodes 176, 178 are coupled through the capacitor 180 to the positive potential terminal 47, and are also coupled to the overload switch 26 to provide an energizing signal thereto.

The current transformer 170 is a ferrite-pot-core which is small in size and passes square waves readily. The diodes 172, 174, 176, 178 are of the silicon type to provide better thermal stability.

The output signal which appears across the secondary 170b of the current transformer 170 is dependent upon the value of the current output of the transistors 162, 164 of the power amplifier stage 20. The output signal thus derived, is rectified by the diodes 172, 174, 176, 178 to produce a D.C. voltage level which is dependent upon the load current and which is coupled to overload switch 26. Capacitor 180 provides a low resistance path for A.C. signals to shunt any ripple voltage in the rectified signal output.

Overload switch 26 which controls cutoff of control amplifier 12 responsive to the detection of a current overload thereon basically comprises a first and a second transistor 182, 184, each having a collector electrode 182c, 184c, a base electrode 182b, 184b, and an emitter electrode 182e, 184e, respectively, coupled for alternative conduction in response to a D.C. signal from the overload detector 24 to bias the control amplifier 12 to cutoff.

The base 182b of the first transistor 182 is resistance-coupled to the overload detector 24 through a fixed resistor 186, a variable resistor 188, and the parallel combination of a resistor 190 and a thermistor 192 in series with resistor 194. The base 182b is also coupled to a biasing voltage divider comprising two resistors 196, 198 connected from the negative potential terminal 46 to the positive potential terminal 47. Collector 182c of transistor 182 is loaded by a resistor 200 coupled to the negative potential terminal 46, and is coupled through a resistor 202 to the base circuit of the second transistor 184.

Base 184b of the transistor 184 is biased by a voltage divider comprising resistors 200 and 202 connected in series from the base 184b to the negative potential terminal 46, and a resistor 204 and a capacitor 206 connected in parallel between the base 184b and the positive potential terminal 47. The collector 184c of the second transistor 184 is loaded by a lamp 208 coupled to the emitters 70e, 72e of the pair of transistors 70, 72 of the control amplifier 14. The emitters 182e, 184e in the overload switch circuit 26 are connected together, and the common point coupled through a current feedback resistor 210 to the positive potential terminal 47.

The first transistor 182 is biased to be normally conductive, and the second transistor 184 is biassed to be normally non-conductive. If the output of the current overload detector 24 increases above a predetermined level, indicating a current output by the power amplifier 20 greater than its rated value, the base 182b is biassed sufficiently positive to cause a reduction in the output signal of the first transistor 182. A more negative signal output in the output circuit coupled to the collector 182c of the first transistor 182 is extended to the base 184b of the second transistor 184 to cause the second transistor 184 to conduct. The negative signal at the base 184b of the second transistor 184 is coupled back to the collector 182c of the first transistor 182 through the common connection of the emitters 182e, 184e. The resultant signal effects biassing of the first transistor 182 to cutoff and the output signal thereof in turn drives the second transistor 184 to its saturation level. Collector 184c of the second transistor 184 couples a positive signal to the emitters 70e, 72e of the transistor pair 70, 72 of control amplifier 12. Since these are NPN type transistors, a positive signal will render them non-conductive, and no further signals are coupled to the trigger circuit 14 and the chain of amplifiers 16, 18, 20.

The second transistor 184 is designed to draw emitter current in its saturation state which is of a value to effect an induced drop across the current feedback resistor 210 sufficient to maintain the first transistor 182 to cutoff even after the cessation of the D.C. positive signal coupled thereto by the overload current detector 24. Thus, the return of the power amplifier circuit 20 to its quiescent state, as a result of the cutoff of the control amplifier circuit 12 and the resultant cutoff of the overload current, does not permit the inverter to resume normal operation. The inverter is enabled for further operation only responsive to a specific operation described more fully hereinafter.

Th energization of any one of the overload switches 26, 26a, 26b effects conductivity of its associated one of the transistors 184, 184', 184'' to provide a positive signal over conductor c sufficient to bias the control amplifier circuit 12 to cutoff.

Lamp 208 lights whenever the second transistor 184 of an overload switch, such as 26, is conductive to furnish an indication as to which one of the three power amplifier circuits 20, 20a, 20b is overloaded. The overloaded circuit is then disconnected, and the other circuits may be placed back into operation by pressing the normally-closed reset switch 80 to the open condition and then restoring the switch to the close position. As reset switch 80 is opened, the energizing circuit for the collectors, such as 184c, of the energized one or ones of the transistors 184 is interrupted. Transistors 182, 184 of the enabled one or ones of the overload switches 26 are restored to their normally biassed conditions (the transistors of the other overload switches, such as 26a, 26b, have remained in such condition if no overload occurred therein). Since the first transistor 182 is conductive and the second transistor 184 is biassed to cutoff in each of the overload switches at this time, the positive bias is no longer coupled to the emitters 70e, 72e of the control amplifier circuit 12 and transistors 70, 72 of the control amplifier circuit 12 will conduct as the reset switch 80 is reclosed. Capacitor 206 is connected in the biasing arrangement for the base 184b of the second transistor 184 to delay its return to the cutoff state for a sufficient time period to permit the first transistor 182 to sample the output signal of its associated current overload detector 24 prior to the return of second transistor 184 to its operating condition. Reset switch 80 is of the type which is pressed and released so that the energizing potential is not connected to the transistors 70, 72 of the control amplifier circuit 12 until after the overload switch 26 has become operational, to thereby prevent operation of the control amplifier circuit 12 and further circuits prior to reenablement of the protection equipment.

Resistor 188 may be varied to adjust the operating threshold of the overload switch 26. Thermistor 192 maintains the response of the overload switch 26 constant over a range of temperature fluctuations in the manner described above. As an added safety measure, transistors 182, 184 are oversized to afford additional protection against overheating in the overload switch 26.

As noted heretofore, one arrangement of the novel converter of the present invention comprises a set of multiple stages 1, 2, 3 for providing a plurality of power sources. In the disclosed arrangement, stages 2 and 3 are similar to stage 1 in both design and operation. Referring to FIGURES 5 and 6, it may be seen that like components have been identified by similar numbers, and that conductors common to all circuits in FIGURES 3, 4, 5, and 6 have been identified with identical letters. In that the operation of the stages 2, 3 is similar to that heretofore described for stage 1, it is believed that an understanding of the invention will be apparent therefrom.

SPECIFIC CIRCUIT OPERATION

With the coupling of source 8 to the static inverter circuit of FIGURE 3 the oscillator circuit 10 generates a low power sine wave signal output which is amplified by the control amplifier 12, and coupled to the trigger circuit 14 to produce a square wave output. Due to the very rapid switching action of the trigger circuit 14, the square wave has very short rise and fall times. The square wave output signal is amplified by the chain of cascaded transistor amplifiers comprising preamplifier circuit 16, driver amplifier circuit 18, and power amplifier circuit 20 to provide a high power A.C. signal output across the output terminals 22, 23.

All the transistors in the square wave amplifiers 16, 18, 20 are biased so that, during operation thereof to produce the square wave output the transistors are driven between the "off" state or the saturation state in extremely short time intervals (the rise and fall time of the square wave). Since the heating of transistors occurs primarily during the amplification of signals insufficient to drive them to saturation, a square wave of short rise and fall time induces little heating through power consumption. This in turn permits a greater power output to be drawn from the transistors of the power amplifier stage 20 than was heretofore possible.

Further protection against overheating is afforded by the current overload detector 24 and overload switch 26. The overload detector 24 provides a signal to the overload switch 26 which increases to a value sufficient to energize the switch 26 when the current output of the power amplifier 20 increases above its rated value. When energized, the switch 26 immediately biasses the transistors 70, 72 of the control amplifier 12 to cut "off" to prevent the sine wave of the oscillator 10 from driving the trigger circuit 14.

Overheating of the transistors 162, 164 of the power amplifier 20 may be effected by connecting too great a load to output terminals 22, 23, or by a short circuit in the terminals 22, 23, so that the transistors are not driven into their saturation state, but operate in a state producing greater heating. Both these overheating conditions are indicated by a load current of greater than rated value, and the overload detector 24 will operate to interrupt the operation of the inverter.

The detection of an overload current in any of the power amplifying stages 20, 20a, 20b cuts off the drive signal to all of the trigger circuits 14, 14a, 14b. However the lamps 208, 208', 208'' permit a rapid determination as to which one of the stages includes the fault. Such circuit may then be detached from the inverter for trouble-shooting, and the other stages of the inverter be immediately reactivated by pressing the reset switch 80.

In one specific embodiment, producing three output signals of 115 v. at 400 va. and 400 c.p.s. each, which is included by way of example, and which is not to be considered limiting in scope, the static converter components comprised:

*Chart I*

Transistors:
| | |
|---|---|
| 30, 32, 90, 90', 90'', 92, 92', 92'', 130, 130', 130'' | 2N188A |
| 70, 72 | 2N339 |
| 140, 140', 140'', 142, 142', 142'', 182, 182', 182'', 184, 184', 184'' | H7 |
| 162, 162', 162'', 164, 164', 164'' | 2N575A |

Thermistors:
| | |
|---|---|
| 64, 192, 192', 192'' | D301 |
| 108, 108', 108'' | D302 |
| 106, 106', 106'' | R174 |

Resistors:
| | | |
|---|---|---|
| 45, 136, 136', 136'', 202, 202', 202'' | ohms | 680 |
| 48 | do | 4.7K |
| 50 | do | 15K |
| 52, 118, 118', 118'', 148, 148', 148'', 156, 156', 156'' | ohms | 330 |
| 56, 146, 146', 146'' | do | 10K |
| 58 | do | 18K |
| 60, 110, 110', 110'', 132, 132', 132'' | ohms | 5.1K |
| 62 | do | 30K |
| 74, 198, 198', 198'', 204, 204', 204'' | ohms | 100 |
| 76 | do | 22K |
| 78 | do | 39 |
| 86 | do | 10 |
| 94, 94', 94'' | do | 5.6K |
| 96, 96', 96'' | do | 2.2K |
| 98, 98', 98'' | do | 1K |
| 100, 100', 100'' | do | 390 |
| 102, 102', 102'' | do | 7.3K |
| 104, 104', 104'' | do | 4.3K |
| 112, 112', 112'', 194, 194', 194'' | do | 3K |
| 116, 116', 116'' | do | 68 |
| 120, 120', 120'' | do | 47 |
| 124, 124', 124'', 152, 152', 152'' | do | 470 |
| 134, 134', 134'' | do | 150 |
| 150, 150', 150'' | do | 2 |
| 158, 158', 158'' | do | 15 |
| 186, 186', 186'', 188, 188', 188'' | do | 2K |
| 190, 190', 190'' | do | 2.6K |
| 196, 196', 196'' | do | 1.5K |
| 200, 200', 200'' | do | 250 |
| 210, 210', 210'' | do | 33 |

Capacitors:

| | |
|---|---|
| 34, 36 | U.F.  0.22 |
| 40, 84 | U.F.  0.1 |
| 40a, 180, 180', 180'' | U.F.  0.22 |
| 66 | U.F.  1500 |
| 68, 88, 88', 88'', 126, 126', 126'' | U.F.  25 |
| 122, 122', 122'' | U.F.  0.0 |
| 160, 160', 160'' | U.F.  100 |
| 206, 206', 206'' | U.F.  0.047 |

Diodes:

| | |
|---|---|
| 44 | SV11 |
| 172, 172', 172'', 174, 174', 174'', 176, 176', 176'', 178, 178', 178'' | 3AS2 |

Transformers: 170, 170', 170'' _____ D25116

The inverter of such structure provides three output power square wave signals of vertical rise time and decay. The preamplifiers 16, 16a, 16b provide isolation between the stages 1, 2, 3, so that a loading applied to one of the stages 1, 2, 3 does not affect the operation of the other stages. Each of the three independently operating 400 c.p.s. square wave signals thus provided produces 400 volt amperes of power. Output transformers 166, 166', 166'' are used to step up the output signal to 115 volts at 3.5 amperes.

By use of transistor devices, the novel static power inverter is extremely light and compact, providing an ease of portability heretofore unknown. Further, the novel inverter is silent in operation, has no moving parts other than simple switches, providing dependable operation free from component breakdown, and has a very high efficiency.

Ostensibly the novel inverter circuit is conveniently manufactured with printed circuit techniques to provide economic production with small weight and size, and to permit the power transistors 162, 164 to be mounted directly on isolated heat sinks. The isolation of these heat sinks from the chassis of the inverter permits an efficient use of the low temperature gradient of the power transistors 162, 164 for a further safety factor in the prevention of overheating of these transistors 162, 164. Servicing of the inverter may be facilitated by building various units and stages on plug-in boards.

While what is described is regarded to be a preferred embodiment of the invention, it will be apparent that variations, rearrangements, modifications and changes may be made therein without departing from the scope of the present invention as defined by the appended claims.

What is claimed is:

1. A static power inverter for converting the energy of a direct current source to an alternating current comprising a signal generator means for periodically providing current reversing signals responsive to the coupling thereof to said direct current source, means coupled to said signal generator means operatively controlled by said current reversing signals to provide output signals of a sharp rise time and a sharp decay time, amplifier means including at least one semiconductor unit connected as an amplifier, means for coupling at least certain of said output signals to said semiconductor unit, and output means for connecting the output of said semiconductor unit to associated load means.

2. A static power inverter for converting the energy of a direct current source to an alternating current comprising signal generator means for periodically providing current reversing signals responsive to the coupling thereof to said direct current source, trigger circuit means coupled to said signal generator means operatively controlled by said current reversing signals to provide square wave output signals having a sharp rise time and a sharp decay time, a first amplifier means including at least one transistor unit connected as an amplifier, means for coupling at least certain of said square wave signals to said transistor unit including a second amplifier means for amplifying said signals to a value to operate said first amplifier to saturation as coupled thereto, and output means for connecting the output of said transistor unit to associated load means.

3. A static power inverter for converting the energy of a direct current source to an alternating current comprising oscillator means for periodically providing current reversing signals responsive to the coupling thereof to said direct current source, a trigger circuit coupled to said oscillator means operatively controlled by current reversing signals to provide square wave output signals having a sharp rise time and a sharp decay time, a power amplifier means including at least one transistor unit connected as a power amplifier, coupling means for coupling at least certain of said square wave signals to said transistor unit including a driver amplifier for amplifying said signals to a value to operate said transistor to saturation as coupled thereto, and output means for connecting the output of said transistor to associated load means.

4. A static power inverter as set forth in claim 3 in which said coupling means includes a preamplifier means coupled between said trigger circuit and said driver amplifier to isolate the same from each other and to preamplify the signal output of the trigger circuit prior to coupling thereof to said driver amplifier.

5. A static power inverter for converting the energy of a direct current source to an alternating current comprising: signal generator means for periodically providing current reversing signals responsive to coupling thereof to said direct current source; and a plurality of output stages, each of which comprises a trigger circuit coupled to said signal generator means operatively controlled by said current reversing signals to provide output signals of a sharp rise time and a sharp decay time, power amplifier means including at least one transistor unit connected as a power amplifier, means for coupling at least certain of said output signals to said transistor unit, and output means for connecting the output of said transistor unit to associated load means, the individual stages being thus connected to generate separate power signals from the common signal generator means.

6. A static power inverter for converting the energy of a direct current source to an alternating current comprising: signal generator means for periodically providing current reversing signals responsive to coupling thereof to said direct current source; and a plurality of output stages, each of which comprises a trigger circuit coupled to said signal generator means operatively controlled by said current reversing signals to provide output pulses of sharp rise time and a sharp decay time, power amplifier means including at least one transistor unit connected as a power amplifier, means for coupling at least certain of said output pulses to said transistor unit, output means for connecting the output of said transistor unit to associated load means, current overload means including current overload detector means, and switch means connected to interrupt the coupling of said current reversing signals to said trigger circuit responsive to the detection of an overload condition by said detector means.

7. A static power inverter for converting the energy of a direct current source to an alternating current comprising: signal generator means for periodically providing current reversing signals responsive to coupling thereof to said direct current source; a control amplifier connected to amplify the output signals of said signal generator means; and a plurality of output stages each of which includes a trigger circuit connected to said control amplifier to provide output pulses of a sharp rise time and a sharp decay time in response to the coupling of said current reversing signals thereto, amplifier means including at least one transistor unit connected as a signal amplifier, means for coupling said output pulses to said transistor unit, output means for connecting the output of said transistor to associated load means, and current overload means for coupling a blocking signal to said control amplifier to operate same to cutoff responsive to the detection of an overload condition in its associated stage.

8. A static power inverter as set forth in claim 7 which includes switch means for separately disconnecting each of said stages from said control amplifier and reset means for re-enabling the circuit means of the connected ones of said stages including the current overload means therein.

9. A static power inverter for converting the energy of a direct current source to an alternating current comprising: signal generator means for periodically providing current reversing signals responsive to coupling thereof to said direct current source; a control amplifier connected to amplify the output signals of said signal generator means; a plurality of output stages each of which includes a trigger circuit connected to said control amplifier to provide square wave signals of a sharp rise time and a sharp decay time in response to the coupling of said current reversing signals thereto, amplifier means including at least one transistor unit connected as a signal amplifier, means for coupling said square wave signals to said transistor unit, output means for connecting the output of said transistor to associated load means, current overload means for coupling a blocking signal to said control amplifier to operate same to cutoff responsive to the detection of an overload condition in its associated stage, and switch means for disconnecting the stage having the overload condition; and a common reset means connected to simultaneously reenable the connected ones of said stages including time delay means in each current overload means operative to prevent re-enablement of its associated stage for a predetermined time interval subsequent to operation of said reset means.

10. A static power inverter for converting the energy of a direct current source to an alternating current comprising: a sine wave oscillator circuit for periodically providing sine wave signals responsive to the coupling thereof to said direct current source; a control amplifier connected to amplify the sine wave output signals of said oscillator circuit; and a plurality of output stages connected to said control amplifier, each of which includes a trigger circuit operative to provide square wave output signals having a sharp rise time and a sharp decay time in response to the coupling of said sine wave signals thereto, power amplifier circuit means including a pair of transistor units connected in a push-pull amplifying circuit, means for coupling alternate ones of said square wave output signals to alternate ones of said transistor units, each of said square wave signals being of a value to drive said power transistors to saturation instantly with the coupling thereof to said transistors, and output means for connecting the signal output of said transistor units to associated load means.

11. A static power inverter as set forth in claim 10 in which said oscillator and said trigger circuits include thermistor means connected to maintain the operation of said oscillator and trigger circuit stable responsive to changes in the ambient temperature.

12. In a static power inverter device, signal generator means for periodically providing current reversing signals, a trigger circuit connected to said signal generator means operative to provide output signals of a sharp rise time and a sharp decay time in response to the coupling of said current reversing signals thereto, amplifier means including at least one transistor unit connected as a power amplifier, means for coupling at least certain of said output signals to said transistor unit, each of said signals being of a value to instantly drive said transistor unit to saturation responsive to the coupling thereof to said transistor unit, and output means for connecting the output of said transistor unit to associated load means.

13. A static power inverter for converting the energy of a direct current source into alternating current energy comprising signal generator means for producing low power, constant frequency, low distortion sine wave type signals, means including voltage regulating means coupled to said direct current source to provide an energizing potential of constant amplitude to said signal generator means, means coupled to said signal generator means operatively controlled by said sine wave type signals to provide corresponding output signals, each of which has a sharp rise time and a sharp decay time, amplifier means including at least one semiconductor unit connected as an amplifier, means for coupling at least certain of said output signals having said sharp rise and decay times to said semiconductor unit, and output means for connecting the signal output of said semiconductor amplifier unit to associated load means.

14. A static power inverter as set forth in claim 13 which includes temperature compensating means coupled to said signal generator means operative to control said signal generator means in the provision of constant value output signals substantially independent of variations otherwise caused by ambient temperature variations.

References Cited in the file of this patent

UNITED STATES PATENTS

| | | |
|---|---|---|
| 2,424,972 | Dubin | Aug. 5, 1947 |
| 2,451,021 | Detuno | Oct. 12, 1948 |
| 2,683,852 | Sampson | July 13, 1954 |
| 2,827,576 | Wohlers | Mar. 18, 1958 |
| 2,839,693 | Weise | June 17, 1958 |